United States Patent
Rojeski

(10) Patent No.: US 8,658,310 B2
(45) Date of Patent: *Feb. 25, 2014

(54) HIGH CAPACITY ELECTRODES

(71) Applicant: Ronald Anthony Rojeski, San Diego, CA (US)

(72) Inventor: Ronald Anthony Rojeski, San Diego, CA (US)

(73) Assignee: Catalyst Power Technologies, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/670,208

(22) Filed: Nov. 6, 2012

(65) Prior Publication Data

US 2013/0078523 A1   Mar. 28, 2013

Related U.S. Application Data

(63) Continuation of application No. 12/392,525, filed on Feb. 25, 2009.

(60) Provisional application No. 61/130,679, filed on Jun. 2, 2008, provisional application No. 61/067,018, filed on Feb. 25, 2008.

(51) Int. Cl.
*H01M 4/02* (2006.01)
*H01M 2/16* (2006.01)

(52) U.S. Cl.
USPC .......................................... 429/209; 429/142

(58) Field of Classification Search
None
See application file for complete search history.

(56) References Cited

U.S. PATENT DOCUMENTS

| | | | |
|---|---|---|---|
| 3,775,216 A | 11/1973 | Frentrop | |
| 4,329,403 A | 5/1982 | Baker | |
| 5,674,642 A | 10/1997 | Le et al. | |
| 5,705,291 A * | 1/1998 | Amatucci et al. | 429/137 |
| 6,194,099 B1 | 2/2001 | Gernov et al. | |
| 6,815,121 B2 * | 11/2004 | Dasgupta et al. | 429/212 |
| 6,863,942 B2 | 3/2005 | Ren et al. | |
| 7,147,966 B2 | 12/2006 | Ren et al. | |
| 7,189,476 B1 | 3/2007 | Macklin et al. | |

(Continued)

FOREIGN PATENT DOCUMENTS

| | | |
|---|---|---|
| CN | 1357899 A | 7/2002 |
| CN | 1420507 A | 5/2003 |

(Continued)

OTHER PUBLICATIONS

Chan, C. High-performance lithium battery anodes using silicon nanowires. Dec. 16, 2007, Nature, vol. 3, pp. 31-36.*

(Continued)

*Primary Examiner* — Ula C Ruddock
*Assistant Examiner* — Daniel Gatewood
(74) *Attorney, Agent, or Firm* — Peters Verny, LLP

(57) ABSTRACT

A high capacity electrode includes a conducting substrate on which a plurality of support filaments are disposed. Each of the support filaments have a length substantially greater than their width and may include, for example, a carbon nano-tube (CNT), a carbon nano-fiber (CNF), and/or a nano-wire (NW). The support filaments are coated with a material, such as silicon, having a greater ion absorbing capacity greater than the neat support filaments. A trunk region of the support filaments proximate to the substrate is optionally kept free of ion absorbing material. This trunk region allows for the expansion of the ion absorbing material without detaching the support filaments form the substrate.

42 Claims, 11 Drawing Sheets

(56) References Cited

U.S. PATENT DOCUMENTS

| | | | |
|---|---|---|---|
| 7,205,069 B2* | 4/2007 | Smalley et al. | 429/129 |
| 7,402,829 B2 | 7/2008 | Green | |
| 7,442,284 B2 | 10/2008 | Ren et al. | |
| 7,745,047 B2 | 6/2010 | Zhamu et al. | |
| 7,854,991 B2 | 12/2010 | Hata et al. | |
| 7,938,996 B2 | 5/2011 | Baughman et al. | |
| 8,053,113 B2 | 11/2011 | Oh et al. | |
| 8,119,288 B2 | 2/2012 | Zhamu et al. | |
| 8,236,452 B2 | 8/2012 | Zhamu et al. | |
| 8,241,793 B2 | 8/2012 | Zhamu et al. | |
| 8,329,293 B2 | 12/2012 | Noguchi et al. | |
| 8,389,157 B2 | 3/2013 | Frank et al. | |
| 8,450,012 B2 | 5/2013 | Cui et al. | |
| 8,492,029 B2 | 7/2013 | Liu et al. | |
| 2003/0044686 A1 | 3/2003 | Bushong et al. | |
| 2004/0234844 A1 | 11/2004 | Morris et al. | |
| 2005/0064291 A1* | 3/2005 | Sato et al. | 429/233 |
| 2005/0230270 A1 | 10/2005 | Ren et al. | |
| 2006/0147797 A1 | 7/2006 | Wu et al. | |
| 2007/0167101 A1 | 7/2007 | Naruse et al. | |
| 2007/0190422 A1 | 8/2007 | Morris | |
| 2008/0013258 A1 | 1/2008 | Viswanathan et al. | |
| 2008/0020193 A1 | 1/2008 | Jang et al. | |
| 2008/0020282 A1 | 1/2008 | Kim et al. | |
| 2008/0193840 A1 | 8/2008 | Shirane et al. | |
| 2008/0261116 A1 | 10/2008 | Burton et al. | |
| 2009/0042102 A1 | 2/2009 | Cui et al. | |
| 2009/0053608 A1 | 2/2009 | Choi et al. | |
| 2009/0068553 A1 | 3/2009 | Firsich | |
| 2009/0169996 A1 | 7/2009 | Zhamu et al. | |
| 2009/0305135 A1 | 12/2009 | Shi et al. | |
| 2010/0015933 A1 | 1/2010 | Kerselaers | |
| 2010/0136431 A1 | 6/2010 | Lee et al. | |
| 2010/0178417 A1 | 7/2010 | Conner et al. | |
| 2010/0178531 A1 | 7/2010 | Amaratunga et al. | |
| 2010/0203362 A1 | 8/2010 | Lam et al. | |
| 2010/0221596 A1 | 9/2010 | Huggins et al. | |
| 2011/0070488 A1 | 3/2011 | West et al. | |
| 2011/0076542 A1 | 3/2011 | Farmer | |
| 2011/0143198 A1 | 6/2011 | Choi et al. | |
| 2011/0165462 A1 | 7/2011 | Zhamu et al. | |
| 2011/0165466 A1 | 7/2011 | Zhamu et al. | |
| 2011/0229761 A1 | 9/2011 | Cui et al. | |
| 2011/0281156 A1 | 11/2011 | Boren et al. | |
| 2012/0107582 A1 | 5/2012 | Metz et al. | |
| 2012/0250225 A1 | 10/2012 | Aria et al. | |
| 2013/0143124 A1 | 6/2013 | Lee et al. | |

FOREIGN PATENT DOCUMENTS

| | | |
|---|---|---|
| EP | 2037516 B1 | 12/2011 |
| JP | 2002313319 A | 10/2002 |
| JP | 2006179431 A | 7/2006 |
| JP | 2010103051 A | 5/2010 |
| JP | 2010525549 A | 7/2010 |
| WO | 2011068911 A3 | 6/2011 |
| WO | 2012069245 A1 | 5/2012 |
| WO | 2012084570 A1 | 6/2012 |

OTHER PUBLICATIONS

U.S. Appl. No. 13/670,235, filed Nov. 6, 2012, Ronald Rojeski, High Capacity Electrodes.
U.S. Appl. No. 13/725,969, filed Dec. 21, 2012, Ronald Rojeski, Energy Storage Devices.
U.S. Appl. No. 12/904,113, filed Oct. 13, 2010, Ronald Rojeski, Electrodes Including Collar Stop.
Chinese application 200980106188.5 Applicant's response to Office Action submitted Jan. 8, 2013.
Chinese application 200980106188.5 Office Action dated Aug. 31, 2012.
PCT/US09/35195 International Search Report and Written Opinion, May 5, 2009.
Bourzac, K., "Doubling Lithium-Ion Battery Storage," Technology Review, pp. 1-2, Sep. 17, 2010.
Liangbing, H., et al. "Thin, Flexible Secondary Li-Ion Paper Batteries," Dept. of Mat. Scie. and Eng., Stanford University, Stanford, CA 94305, pp. A-F Jul. 2010.
Patel, P., "Nanowire Advance for Lithium Batteries," NicerNews, Aug. 14, 2009, http://www.technologyreview.com.
Redden, C., "Nanowire Formation in Anodic Alumina Templates," pp. 1-13, Shelby Hall Room 151, 12:45pm, Nov. 11, 2008.
Berger, M., "Using nanotechnology to improve Li-ion battery performance," Nanowerk Spotlight (www.nanowerk.com), Apr. 7, 2008.
Lu, C., et al., "Controlling the Diameter of Carbon Nanotubes in Chemical Vapor Deposition Method by Carbon Feeding," J. Phys. Chem. B 2006, 110, 20254-20257.
Yao, Y., et al., "Temperature-mediated growth of single-walled carbon-nanotube intramolecular junctions," Nature Materials, vol. 6, Apr. 2007.
Chen, L.-H., et al., "Control of carbon nanotube morphology by change of applied bias field during growth," Applied Physics Letters, vol. 85, No. 22, Nov. 29, 2004.
Hossain, S., et al., "Carbon Fiber Composite—A High capacity Anode for Lithium-ion Batteries," LiTech, LLC, Oct. 7-12, 2007.
Eom, J. Y., et al., "Electrochemical Insertion of Lithium into Multiwalled Carbon Nanotube/Silicon Composites Produced by Ballmilling," J. of The Electrochemical Soc., 2006.
Sharma, K. R., "Control of Diameter during Cnt Synthesis in the Three Methods," 2007.
"Silicon Nanotubes Outperform Carbon Nanotubes for Hydrogen Storage" Apr. 20, 2008.
Tarascon, J-M., "Towards the Next Generation of Li-ion Batteries Based on Nanomaterials," Apr. 3, 2006.
Kim, Myung-Hoon, et al., "Electrochemical characteristics of Si/Mo multilayer anode for Li ion batteries," Rev. Mex. F'is. S 53 (1) (2007) 17-20.
Chan, C. K., et al., "High-performance lithium battery anodes using silicon nanowires," Nature Nanotechnology, 3, 31-35, Dec. 16, 2007.
Signorelli, R., et al., "Carbon Nanotube Enhanced Ultracapacitor," MIT Laboratory for Electromagnetic and Electronic Systems, Dec. 2005.
Cui, Y., et al., "Nanowire Li-Ion Batteries as Electrochemical Energy Storage for Electric Vehicles," Stanford University GCEP 2009 Technical Report, Jun. 1, 2009.
Cui, L.-F., et al., "Crystalline-Amorphous Core-Shell Silicon Nanowires . . . " Nano Letters, Jan. 14, 2009.
MIT, "Nanoscientists Fired Up about Battery Alternative," Nanotechnology,Feb. 8, 2006.
U.S. Appl. No. 12/904,113 non-final Office Action mailed Jan. 18, 2013.
Lithium-ion battery, Wikipedia, http://en.wikipedia.org/wiki/Lithium-ion_battery, pp. 1-21.
Synthesis of Vertically Aligned Carbon Nanofiber Films by RF Magnetron Sputtering, Defense Technical Information Center Compilation Part Notice, ADP012146, Symposium Apr. 17-20, 2001, San Francisco, CA., pp. 1-5.
CN200980106188.5, Second Office Action, issued Apr. 22, 2013, pp. 1-9.
KR10-2010-7018725, Preliminary Rejection, issued May 30, 2013, pp. 1-3.
PCT/US2013/028108, Search Report and Written Opinion, issued May 3, 2013, pp. 1-13.
JP2010-547867, Non-Final Office Action, issued Jul. 30, 2013, pp. 1-9.
Christensen, Jake, et al., A Critical Review of Li/Air Batteries, Journal of The Electrochemical Society; 159(2) R1-R30, (2012).
Horstmann, Birger, et al., Rate-dependent morphology of Li2O2 growth in Li-O2 batteries, arXiv:1307.6621v1, [phyusics.chem-ph] (Jul. 25, 2013).

* cited by examiner

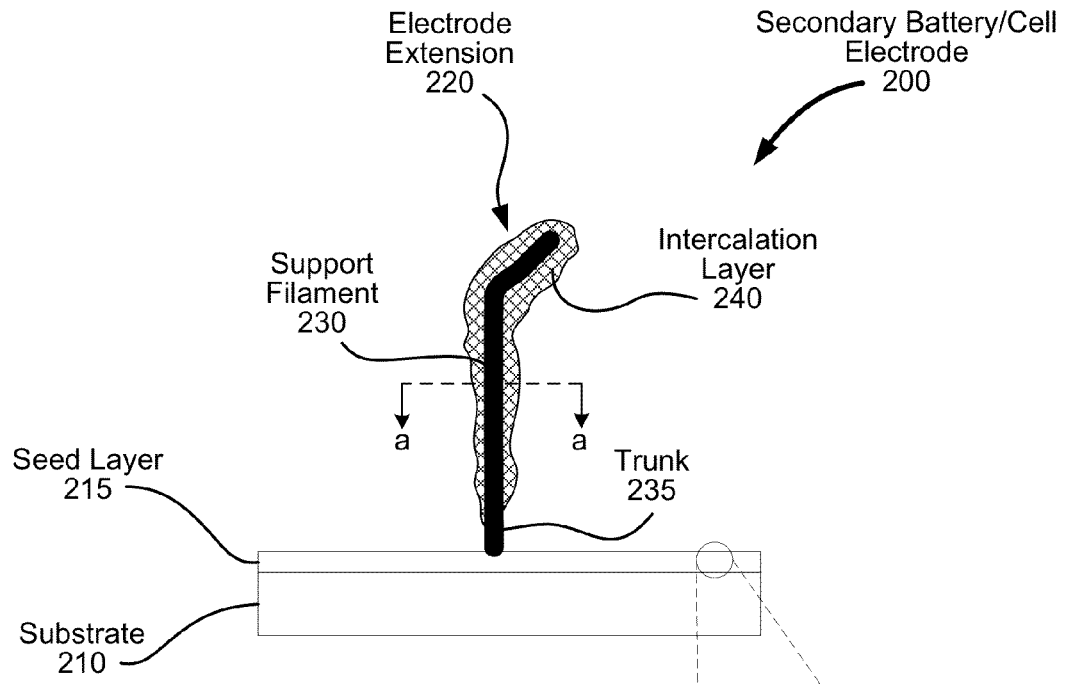
FIG. 2A
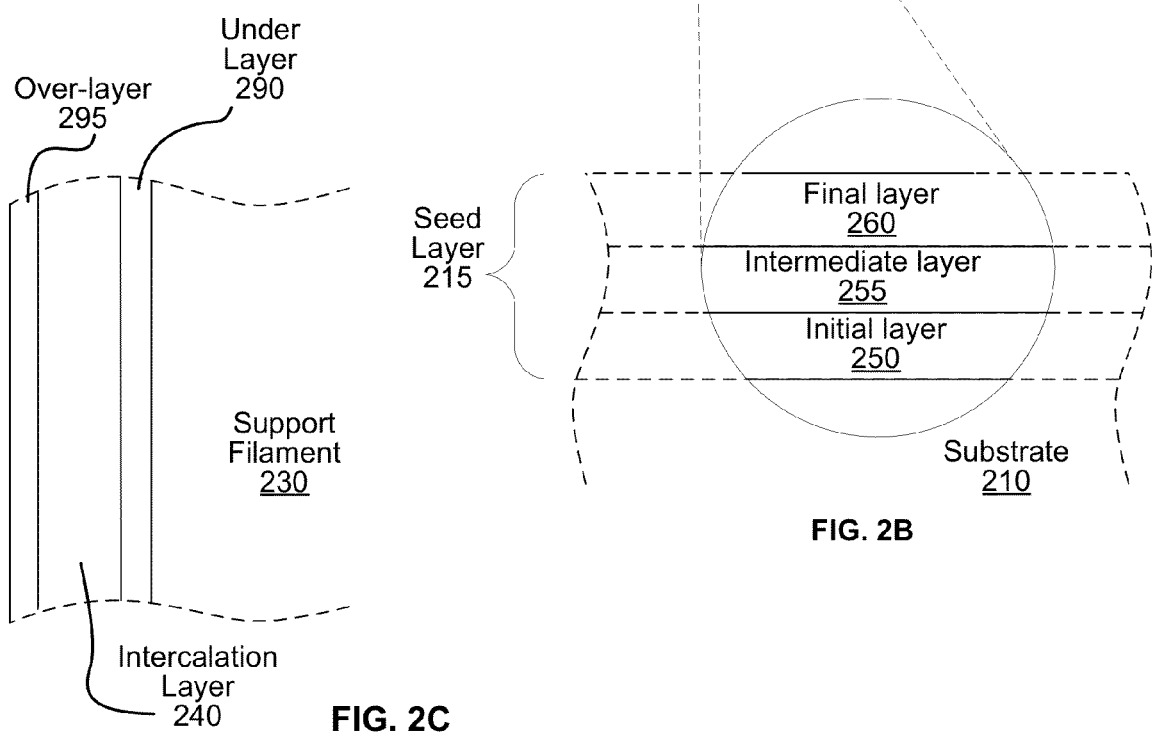
FIG. 2B
FIG. 2C

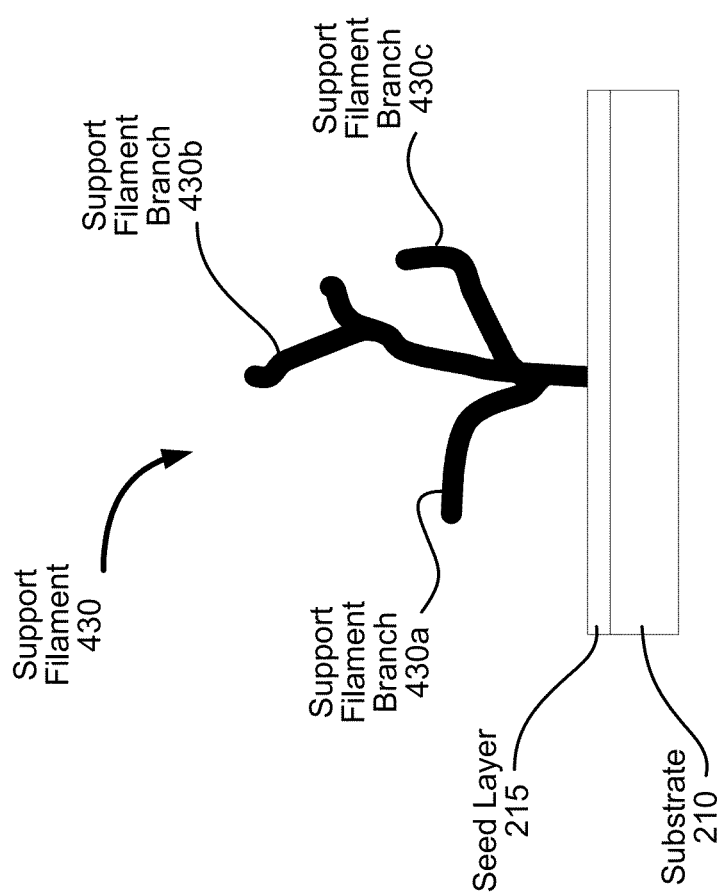

HIGH CAPACITY ELECTRODES

CROSS-REFERENCE TO RELATED APPLICATIONS

This application is a continuation of U.S. patent application Ser. No. 12/392,525 filed Feb. 25, 2009 and also entitled "High Capacity Electrodes" which claims priority of and benefit to U.S. Provisional Patent Applications 61/067,018 filed Feb. 25, 2008 and 61/130,679 filed Jun. 2, 2008. The disclosures of the above applications are hereby incorporated herein by reference.

BACKGROUND

1. Field of the Invention

The invention is in the field of battery technology.

2. Related Art

Four basic design parameters of a battery/fuel cell (battery) include energy density, power density, cycle life, and safety. Energy density refers to how much energy the battery can store, measured in units of mega-joules/kilogram (MJ/kg.) Power density (also referred to as power-to-weight ratio and specific power) refers to how quickly the stored energy per unit mass can be delivered, and is measured in units of kilo-watts/kilogram (W/kg). Cycle life refers to the charge capacity of the battery vs. the number of charge/discharge cycles. Typically, a larger cycle life is more useful. Safety considerations for a battery include processes that could harm person or property, for example, toxic chemical release and overheating to the point of fire.

FIG. 1 illustrates a cross section of a prior art lithium-ion secondary (rechargeable) battery/cell 100. The secondary battery/cell 100 includes an anode 120, an electrolyte 140, a separator 130, an electrolyte 140, and a cathode 110. In some cases, the anode 120 includes graphite. Reasons for using graphite for the anode 120 include relative ease of Li-ion intercalation and low cost of graphite. Alternatively, the anode 120 includes silicon applied directly to the bulk (macroscopic) substrate of the anode. A reason for using silicon is that silicon can intercalate roughly ten times more Li-ions than graphite. Unfortunately, silicon typically expands 400% or more upon full Li-ion intercalation, which can cause silicon breakage and substantially compromise adhesion of silicon to the anode 120, thus, decreasing longevity.

The separator 130 between the secondary battery/cell 100 includes a porous membrane. In some embodiments, the porous membrane is a microporous polyolefin membrane. Microporous polyolefin does not participate in the reactions inside the battery. The separator 130 is typically about 50 microns thick and includes pores 135. A typical average of the size of the pores 135 is about of 2.0 microns or more.

The cathode 110 of the secondary battery/cell 100 is generally of three types. These three types include a layered oxide (such as $LiCoO_2$, $LiMnO_2$, or $LiNiO_2$), a polyanion (such as lithium iron phosphate), or a spinel (such as manganese oxide). The material used for the cathode 110 is typically a bulk material or a bulk deposited/grown film. Unfortunately, due to the macroscopic nature of these materials, ion diffusion in the bulk material of the cathode 110 limits the oxidation and reduction rates during the charge and discharge cycles. The poor diffusion rates of the ions limits the overall power density. The cathode may be electrically coupled to an electrical contact point 150A for drawing current from the battery/cell 100. The anode may be electrically coupled to an electrical contact point 150B for drawing current from the battery/cell 100.

The electrolyte 140 in the secondary battery/cell 100 may be a salt dissolved in a solvent, such as $LiClO_4$, $LiPF_6$, $LiBF_4$, and/or the like.

SUMMARY

Various embodiments of the invention include a system comprising an electrode disposed in a first region of electrolyte and including a substrate, a plurality of support filaments attached to the substrate, and an ion absorbing material attached to the support filaments and configured to expand in volume at least 5 percent when absorbing ions; a separator configured to separate the first region and a second region of electrolyte; and a cathode disposed in the second region of electrolyte, the cathode, anode and separator configured to operate as a rechargeable battery.

Various embodiments of the invention include an electrode comprising a conductive substrate; a plurality of support filaments attached to the substrate, the support filaments comprising a carbon nano-tube (CNT), a carbon nano-fiber (CNF), or a nano-wire (NW), and an ion absorbing material attached to some but not all of each of the support filaments and configured to expand in volume by at least five time when absorbing ions.

Various embodiments of the invention include a method comprising receiving a conductive substrate; forming a plurality of support filaments coupled to the conductive substrate, the support filaments having an aspect ratio (length/width) of at least 10:1; and coating the plurality of support filaments with an ion absorbing material to create an electrode, the ion absorbing material having at least a ten times greater ion absorbing capacity for ions than the support filaments.

BRIEF DESCRIPTION OF THE DRAWINGS

FIG. 2A illustrates a cross section of an electrode, according to various embodiments of the invention.

FIG. 2B is a cross section illustrating details of a seed layer of FIG. 2A according to various embodiments of the invention.

FIG. 2C is a cross section of a portion of the electrode extension of FIG. 2A illustrating an under-layer between a support filament and an intercalation layer, and an over-layer that encapsulates the intercalation layer, according to various embodiments of the invention.

FIG. 4C is a cross section illustrating details of a support filament of FIG. 4A, according to various embodiments of the invention.

DETAILED DESCRIPTION

Figure 1:
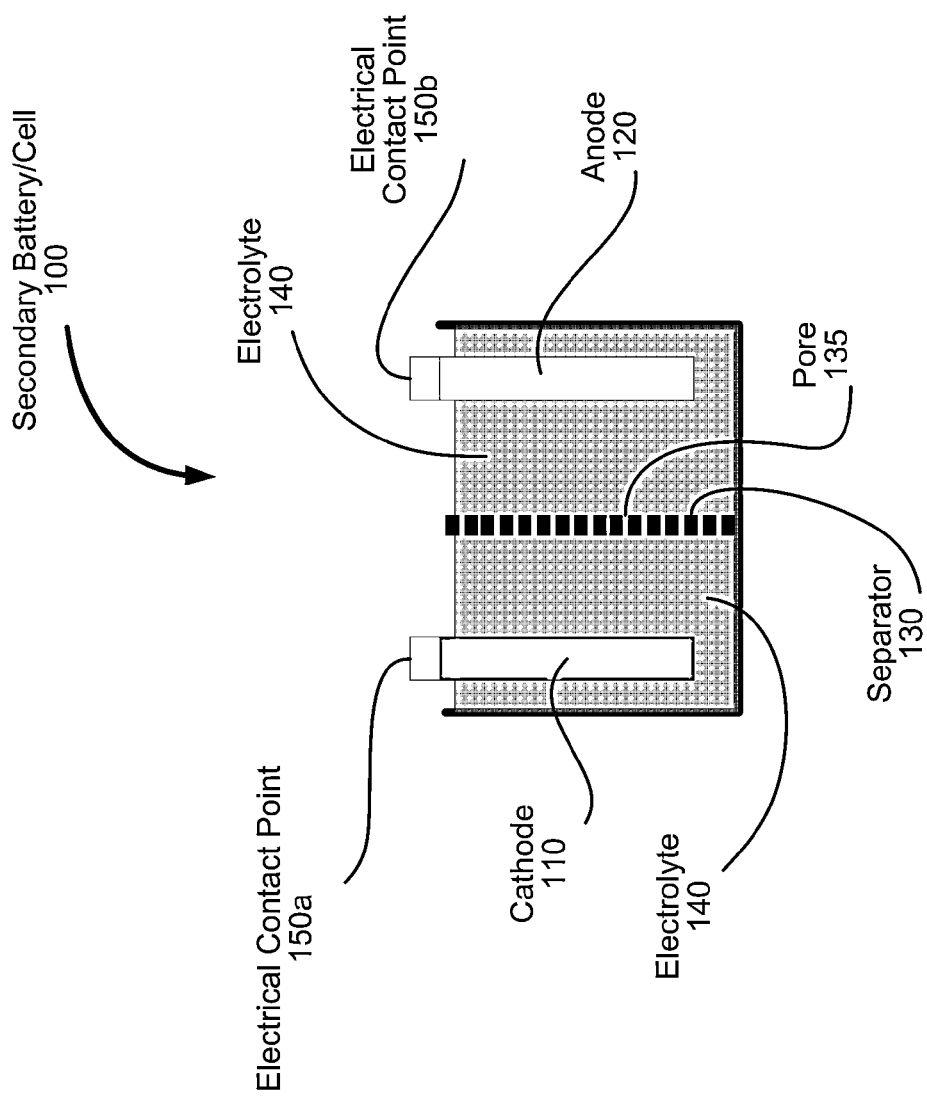
FIG. 1 illustrates a cross section of a prior art rechargeable battery.

Various embodiments of the invention include a rechargeable (secondary) battery including an improved electrode. The electrode of the invention is optionally included within a part of a cathode and/or an anode of a secondary battery/cell 100 to create an improved battery. The electrode typically includes an electrode extension grown on or attached to a substrate using a seed layer. The electrode extension is configured to increase the surface area of the electrode and includes a support filament and an intercalation layer. In various embodiments, the support filament material includes a carbon nano-tube (CNT), a carbon nano-fiber (CNF), a nano-wire NW (a wire having a diameter less than approximately five micrometer), metal, semiconductor, insulator, silicon, and/or the like. The CNT, CNF, and/or NW may be single walled or multi walled. The support filament may provide an electrical path to the substrate and a mechanical base for the intercalation layer. The intercalation layer provides a region for absorption and/or donation of ions from the electrolyte. As used herein, an intercalation layer can be used at both an anode and a cathode. In various embodiments, the intercalation layer includes a donor/acceptor material (DAM) configured for donating and/or accepting the ions from the electrolyte. This ion donating and/or accepting may include both adsorbing and absorbing processes. The intercalation layer may expand in volume by at least 5, 10, 15, 50, 100, 200 or 400 percent on the absorption of ions.

In various embodiments, the DAM includes silicon, graphite, Sn, Sn—C, inter-metallics, phosphides, nitrides, 3D metal oxides, or $LiCoPO_4$, $LiMnPO_4$, $LiMn_2O_4$, $LiCoO_2$, $LiNiO_2$, $MnO_2$, vanadium oxides $V_2O_5$ and $LiV_3O_8$, polyanionic materials such as $Li(1-x)VOPO_4$, $Li(x)FePO_4$), $LiMnO_2$, $Li_2FePO_4F$, doped $LiMn_2O_4$, and/or the like. The DAM is deposited or grown on the support filament. In some embodiments, the support filament is provided with additional strength (e.g., tensile, compression, shear, and/or the like) for supporting the DAM particularly during expansion and/or contraction of the DAM in the intercalation layer. In some embodiments, the DAM covers part but not all of the support filament. For example, portion of the support filament may remain uncoated. The uncoated portion can provide for flexibility and freedom of movement, for example between the electrode extension and the substrate. In some circumstances this reduces the likelihood of separation of the support filament from the seed layer during expansion and/or contraction of the DAM in the intercalation layer.

The electrode extension increase intercalation volume and surface area, thereby improving energy density of the electrode over a layer of material deposited on a flat surface. The electrode extensions may serve as a flexible interface between the substrate and intercalation layer, thereby allowing a large degree of expansion in volume (e.g., 2×, 4×, 6×, etc.) of the intercalation layer, while at the same time reducing a risk of the material separating from the substrate. The electrode extension can also reduce diffusion distances of the ions in the bulk of the intercalation material, therefore improving power density of the electrode.

FIG. 2A illustrates a cross section of an electrode 200. One or more of electrode 200 may be used in a rechargeable battery, such as the secondary battery/cell of FIG. 1, in accordance with various embodiments of the invention. The electrode 200 includes a substrate 210, an optional seed layer 215, and an electrode extension 220. The electrode extension 220 includes a support filament 230 and an intercalation layer 240. The seed layer 215 may be used to initiate growth of the support filament 230 and to facilitate connection of the electrode extension 220 to the substrate 210. In alternative embodiments the electrode extension 220 is coupled directly to the substrate 210. The support filament 230 supports the intercalation layer 240 and provides an electrical path between the intercalation layer 240 and the substrate 210. The intercalation layer 240 includes DAM and provides a surface/volume for intercalation of ions. The electrode 200 typically includes multiple electrode extensions 220.

The support filament 230 is less than roughly 500 nanometers in diameter. (Averaged along its length.) More specifically, the diameter of support filament 230 may vary between 1-10 nanometers, 10-50 nanometers and 100-500 nanometers.

In various embodiments, the substrate 210 includes a porous material, metal, a semiconductor, and/or an insulator. For example, the substrate 210 may include a low oxygen content copper. The substrate 210 may be fabricated in a variety of shapes. For example, the substrate 210 may be planar (single sided and double sided), cylindrical, finned, and/or the like. In some embodiments, the shape of the substrate 210 is selected so as to maximize available surface area. In various embodiments, the thickness of the substrate 210 ranges from 1 micron to 100 microns; from 100 microns to a millimeter; from one millimeter to 3 millimeters, or larger, depending on the particular application of the secondary battery/cell 100.

The optional seed layer 215 serves one or more of a number of functions and may include several sub-layers. For example, the seed layer 215 may comprise an initial layer 250, an intermediate layer, and/or a final layer 260. The seed layer 215 may be configured to control a diameter of the support filament 230 (defined in FIG. 3 as support filament diameter 310) by controlling an area in which initial growth of the support filament 230 occurs. The relative and/or absolute thicknesses of the initial layer 250, an intermediate layer, and/or a final layer 260 can be selected to control the area of initial growth of the support filament 230 and thus the support filament diameter 310. The support filament diameter 310 is alternatively controlled use a reverse-micelle process wherein the diameter 310 of the initiation sites is determined by an appropriate size or amount of seed material used in the reverse-micelle process. Those skilled in the art of CNT/CNF/NW growth will appreciate that other methods are also available to control the diameter of the support filament 230. In some embodiments, the seed layer 215 may control adhesion of the support filament 230 to the substrate. The spacing between adjacent support filaments 230 and/or the diameter of the support filaments may limit the possible thickness of the DAM in the intercalation layer 240, and vice-versa.

The seed layer 215 may control a density of initiation points and/or an areal density of growth initiation points for the support filament 230. The density of initiation points determines the density of support filament 230 attachment points. The density of attachment points may by between $10^6/cm^2$ to $10^{11}/cm^2$, generally $10^7/cm^2$ to $10^{10}/cm^2$. The initiation density may be expressed as a number of support filament initiation sites per unit area, e.g., number/cm². The areal density is the density of support filament 230 tips that are distal from seed layer 215 and substrate 210. The areal density can be greater than the density of attachment points because the support filaments 230 may be branched, as discussed further elsewhere herein. The areal density may be expressed as a number of support filament tips per unit area, e.g., number/cm².

In some embodiments, the seed layer 215 is a single material deposited on the substrate 210 in a single layer. Alternatively, the seed layer 215 includes multiple (2, 3 or more) sub-layers of differing materials, e.g., initial layer 250, intermediate layer, and/or final layer 260. Each of the sub-layers of the seed layer 215 may be configured to perform various functions. For example, one of the sub-layers may include a barrier layer configured to prevent migration of atoms between layers; include an adhesion layer configured to bind two layers together; a protection layer configured to protect underlying or overlying layers from chemical/physical degradation; a conduction layer configured to provide conductivity; a stress/strain layer configured to act as a mechanical buffer between two layers; a binding/release layer configured to bind/release the final seed material to/from the underlying substrate; a layer configured to inhibit the growth of CNT/CNF/NW, and/or a seed layer to initiate CNT/CNF or NW growth. Persons having ordinary skill in the art of thin film growth and deposition will recognize that there other utilities a thin film layered structure of seed layer 215 can serve.

FIG. 2B is a cross section illustrating details of the seed layer 215 of FIG. 2A, according to various embodiments of the invention. The seed layer 215 illustrated in FIG. 2B includes a stack of sub-layers comprising different materials. As described elsewhere herein, the sub-layers include, for example, an initial layer 250, an intermediate layer 255 and a final layer 260. The initial layer 250 is coupled to the substrate and forms a base for the intermediate layer 255. The intermediate layer 255 is deposited on the initial layer 250 and configured to form a base for the final layer 260. The final layer 260 is deposited on the intermediate layer 255 and is configured to provide sites for attachment and initiation of growth of the support filament 230. Alternatively, the final layer 260 is configured to inhibit the growth of CNT/CNF/NW.

In various embodiments, the final layer 260 includes molybdenum, iron, cobalt, nickel and/or the like. Various materials in the final layer 260 may initiate or inhibit growth and/or provide for attachment of the including CNT, CNF, and/or NW. The intermediate layer 255 may include, for example, iron, cobalt, nickel, titanium, titanium nitride, aluminum, and/or the like. The initial layer 250 may include, for example, platinum, tungsten, titanium, chromium, and/or the like. It will be appreciated that alternative materials may be included in the sub-layers of Seed Layer 215.

In various embodiments, the support filament 230 includes NW, CNF, and/or CNT. The support filament 230 provides a mechanical base for deposition and growth of the intercalation layer 240. The support filament 230 may also provide strength (e.g., tensile strength, compression strength, shear strength, and/or the like) to the DAM of the intercalation layer 240. The additional strength reduces or prevents damage to the intercalation layer 240 during expansion and/or contraction of the DAM. In various embodiments, the material of the support filament 230 includes CNT, CNF, NW, metal, semiconductor, insulator, and/or the like. The CNT may include a single wall or multiple walls. In some embodiments, the CNT/CNF of the support filament 230 is configured to act as a DAM.

In some embodiments, the intercalation layer 240 does coat some but not all of the length of the support filament 230. As a result, a portion of the support filament 230 forms an uncoated trunk 235. The trunk 235 is configured to provide a region for flex and motion of the support filament 230. This flex can reduce mechanical stress resulting from expansion and contraction of the intercalation layer 240. If not reduced, this stress can cause breakage and/or separation of the support filament 230 from the seed layer 215. The length of the trunk 235 may range from several angstroms to several microns. In some embodiments the length of the trunk 235 is selected such that the intercalation layer 240 does not reach or only just reaches the seed layer 215 when fully expanded. In various embodiments the length of the trunk is at least 0.1, 0.25, 0.3, 0.5, or 1.0 micrometers. In some embodiments, the length of the trunk 235 is substantially greater than a micron. The trunk 235 is typically located proximate to the end of support filament 230 closest to the seed layer 215. However, uncoated trunk 235 may be provided at other or alternative parts of support filament 230. For example, uncoated trunk 235 may be provided proximate to branches within support filament 230.

In some embodiments, trunk 235 is a region that has reduced coating of intercalation layer 240 relative to other parts of electrode extension 220, rather than a region having no coat at all. For example, trunk 235 may have a coating of intercalation layer 240 whose thickness is less than 10, 25 or 50% of the thickness of the intercalation layer 240 found in other regions of electrode extension 220.

FIG. 2C is a cross section of a portion of the electrode extension 220 of FIG. 2A including an optional under-layer 290 between the support filament 230 and the intercalation layer 240, and an optional over-layer 295 that encapsulates the intercalation layer 240. In some embodiments, the under-layer 290 is configured to provide a seed layer for vapor-liquid-solid (VLS) growth of the intercalation layer 240. Alternatively, the under-layer 290 includes a thin layer (less than one micrometer) of a metal or a series of metals (e.g., gold, silver, copper, and/or the like) or a salt (e.g., LiF). Other materials may be used to form an under-layer 290 depending on the desired effect.

The over-layer 295 may be grown/deposited on the intercalation layer 240. The over-layer 295 may partially or fully encapsulate the intercalation layer 240. The materials that comprise the over-layer 295 include, for example, metals such as gold, silver, copper, and/or the like. The over-layer 295 can also include a diamond-like coating (DLC), or an insulator, such as $SiO_2$, a binder, a polymer, or the like. The thickness of the over-layer 295 is typically less than one micrometer in the case of metals, semiconductors or insulators. In various embodiments, the thickness of the over-layer 295 may be as large as a micrometer for a binder or larger for polymers.

The DAM may be grown/deposited on the support filament 230 using a various methods. These methods include, for example, evaporation, sputtering, PECVD (Plasma-Enhanced Chemical Vapor Deposition), low-pressure chemical vapor deposition (LPCVD), VLS (Vapor Liquid Solid synthesis), electroplating, electro-less deposition, "field-free" chemical vapor deposition (CVD), metal-organic CVD, molecular beam epitaxy (MBE), and/or the like. In some embodiments, the DAM distribution over the surface of the support filament is uniform. Alternatively, the DAM distribution is not uniform over the length of the support filament 230. For example, the trunk 450 height may vary from 0% to 99% of the height of the CNT/CNF/NW. In some embodiments, the DAM proximate to the substrate 210 has a smaller thickness relative to the distal end of the support filament 230. As such, the thickness of the DAM may increase, along support filament 230, with distance from the substrate 210.

The expansion of the DAM is dependent on the materials included in the DAM. For example, in the case of silicon the expansion may be as much 400% For Sn (tin) the expansion may be roughly 233%. Cathodes expansion occurs on insertion of the electrode into electrolyte, and when the battery is driven to overdisharge. The thickness of a DAM can range from several nanometers to several tens of microns. For example, in various embodiments, the thickness (unexpanded) is between 1-10 nanometers, 10-1000 nanometers, 1 micrometer to 50 microns. Larger thicknesses are optionally used on a cathode relative to an anode.

A number of methods may be employed to achieve a desired length for the trunk 235. Examples of such methods include controlling the aspect ratio of the support filaments 230 during growth, directional deposition, electro-deposition, electro-less deposition at the bottom layer to isolate the trunk, sputter and light etch of a masking layer to open the support filament 230 to intercalation layer 240 growth/deposition, pre-coupling layer isolation (i.e. mask seed locations) prior to growth of the support filament 230, modifying growth parameters of the support filament 230 to achieve an advantageous aspect ratio (such as a tree like structure), or performing a deposition and directional etch back to free the support filament 230 from coverage by the DAM.

Figure 3:
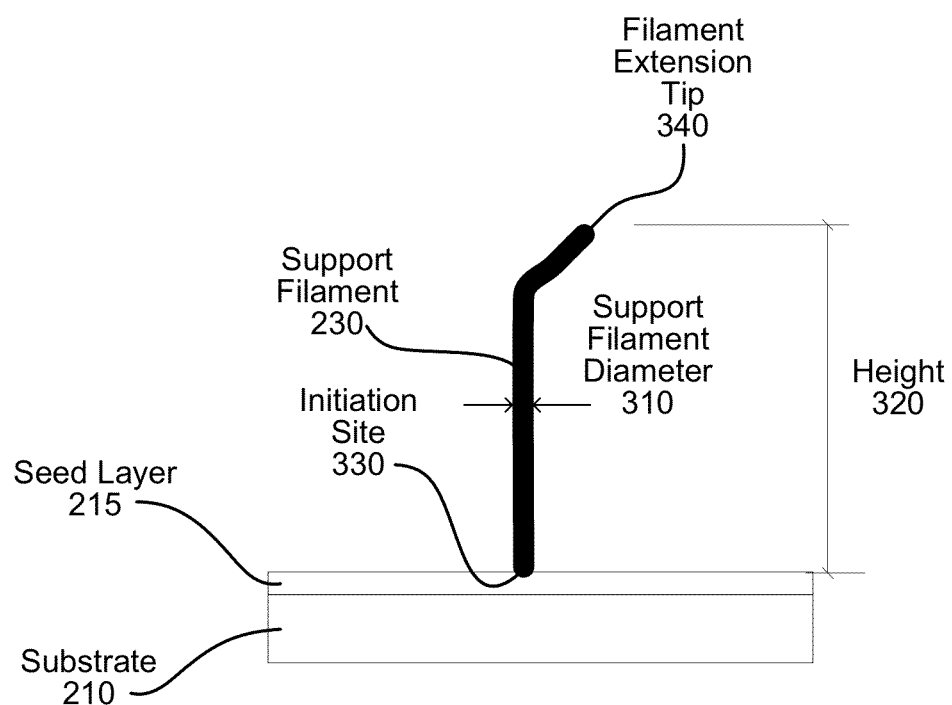
FIG. 3 is a cross section of the electrode of FIG. 2 illustrating details of a support filament of FIG. 2A, according to various embodiments of the invention.

FIG. 3 is a cross section of the electrode 200 illustrating details of the support filament 230 of FIG. 2A. FIG. 3 differs from FIG. 2A in that the intercalation layer 240 is omitted for clarity. In various embodiments, the support filament diameter 310 is less than 10 nanometers, between 10 and 100 nanometers, between 100 and 500 nanometers, and greater than 500 nanometers. The support filament diameter 310 may vary along the length of the support filament 230.

In various embodiments, a height 320 of the support filament 230 is about one micron to about 100 microns, 100 microns to 500 microns, 500 microns to about 1000 microns, or greater than about 1000. This height may vary as support filament 230 tilts or bends. An initiation site 330 for the growth of support filament 230 may include a seeded base where a final layer 260 remains attached to the preceding layer of the seed layer after growth of the support filament 230 is complete. Optionally, the support filament 230 includes a filament extension tip 340 where the final layer separates from the rest of the seed layer and resides on the tip of the support filament after growth is complete.

Figure 4A:
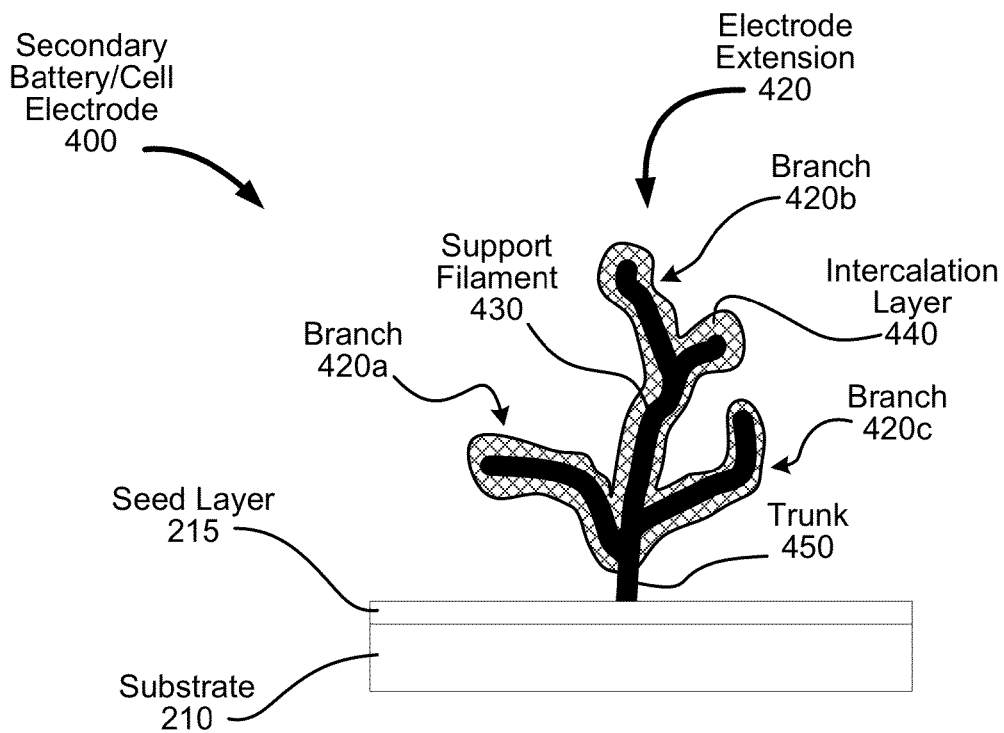
FIG. 4A illustrates a cross section of an alternative electrode, according to various embodiments of the invention.

FIG. 4A illustrates a cross section of electrode 400, according to various embodiments of the invention. The electrode 400 includes an electrode extension 420 which is an alternative embodiment of the electrode extension 220 of FIG. 2A. FIG. 4A differs from FIG. 2A in that the electrode extension 420 illustrated in FIG. 4A includes one or more branches. Specifically, the electrode extension 420 includes a support filament 430, which includes multiple branches 420a, 420b, and 420c which share a single trunk 450 at a single point contact to the seed layer 215. The electrode extension 420 further includes an intercalation layer 440 which may be applied to the support filament 430, including the branches 420a-420c. Support filament 430 and intercalation layer 440 are alternative embodiments of support filament 230 and intercalation layer 240. The multiple branches 420a-420c illustrated in FIG. 4A provide an increase in the effective surface area of the electrode extension 420 and, thus, an increase in the effective volume of the DAM in the intercalation layer 440 and the surface volume of the electrode 400.

The electrode 400 may include multiple electrode extensions 420. The electrode may include a mixture of multiple electrode extensions 220 and 420.

Figure 4B:
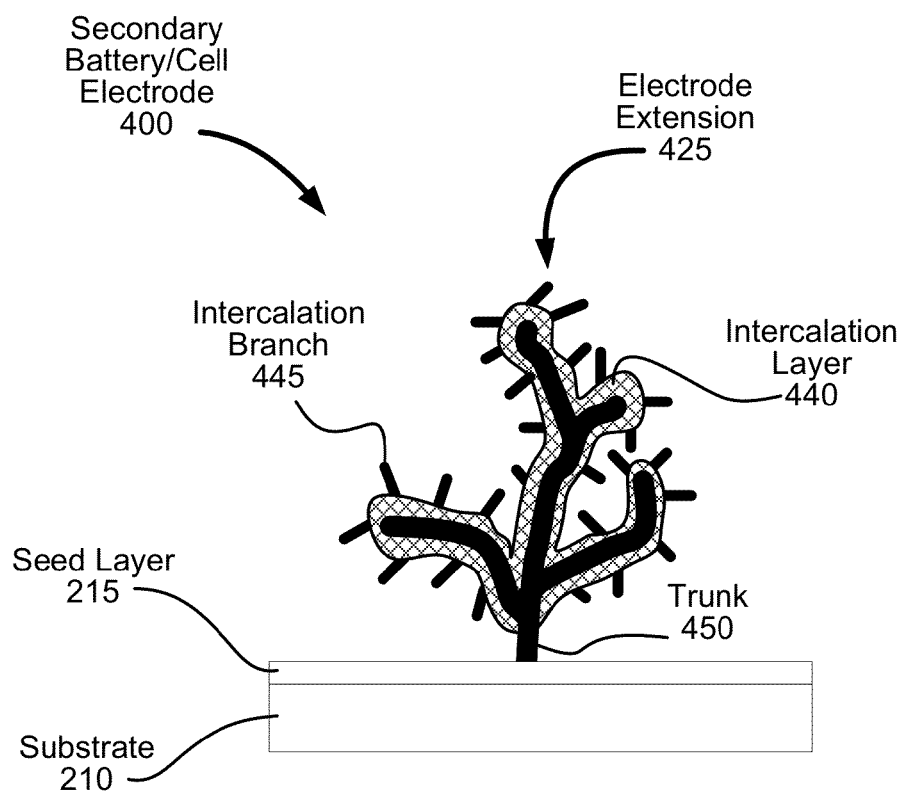
FIG. 4B illustrates a cross section of an alternative electrode, according to various embodiments of the invention.

FIG. 4B illustrates a cross section of alternative embodiments of electrode 400. The electrode 400 includes an electrode extension 425. FIG. 4B differs from FIG. 4A in that the intercalation layer 440 of the electrode extension 425 includes intercalation branches 445 formed by the DAM. Typically the branching structure of the intercalation branches 445 are at a 0-10 nanometer scale. However, in some embodiments, the sizes of branching structure may be greater than ten nanometers. Similarly, the DAM may form branches in the intercalation layer 240 of the electrode extension 220, as illustrated in elsewhere herein. The electrode 400 optionally includes multiple electrode extensions 425. The electrode 400 may include a mixture of multiple electrode extensions 220, 420, and/or 425.

FIG. 4C is a cross section illustrating details of the support filament 430 of FIG. 4A. FIG. 4C differs from FIGS. 4A and 4B in that the intercalation layer 440 is omitted for clarity. FIG. 4C differs from FIG. 3 in that the support filament 430 illustrated in FIG. 4C includes one or more branches 430a-430c whereas the support filament 230 illustrated in FIG. 3 does not include branches. The support filament branches 430a-430c may be generated using a variety of methods. For example, in one method support filament branches 430a, 430b, and 430c are generated by changing reactant gas flow, reactant gas type, and temperature while growth occurs. Persons having ordinary skill in the art of CNT/CNF/NW growth will appreciate that there are a other methods of growing additional branches 430a, 430b, and 430c. While support filament 430 is illustrated as having three support filament branches 430a-430c, the support filament 430 may include more branches or fewer branches.

Figure 5A:
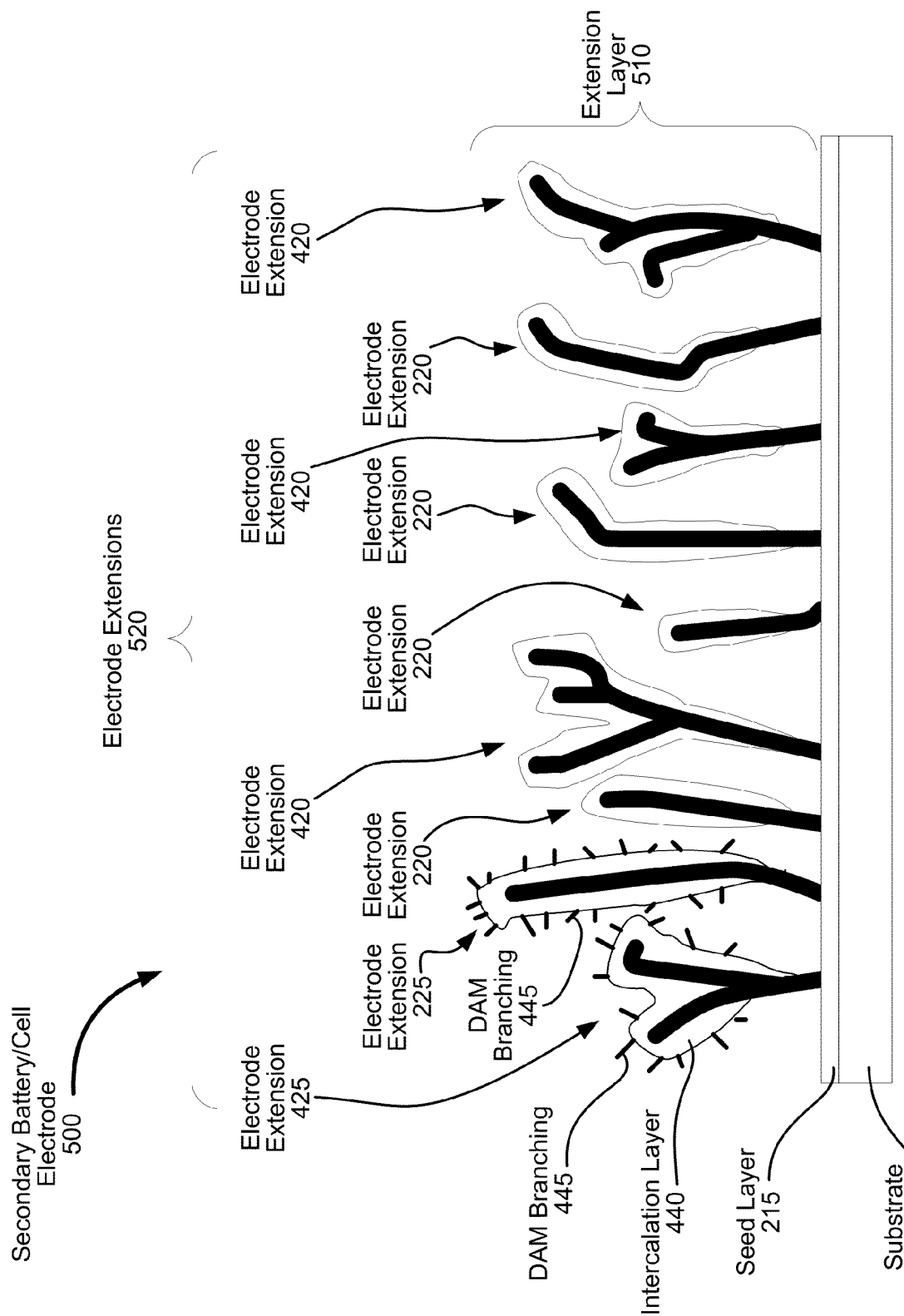
FIG. 5A illustrates a cross section of an alternative electrode, according to various embodiments of the invention.

FIG. 5A illustrates a cross section of an electrode 500, according to various embodiments of the invention. Electrode 500 is an alternative embodiment of electrodes 200 and 400. The electrode 500 includes an extension layer 510. The extension layer 510 includes an array of multiple electrode extensions 520. The electrode extensions 520 include, for example, electrode extensions 220, 420, and/or 425 such as those illustrated in FIGS. 2A, 4A and 4B respectively. The electrode 500 may further include an electrode extension 225 that has intercalation extensions, as discussed elsewhere herein.

Figure 5B:
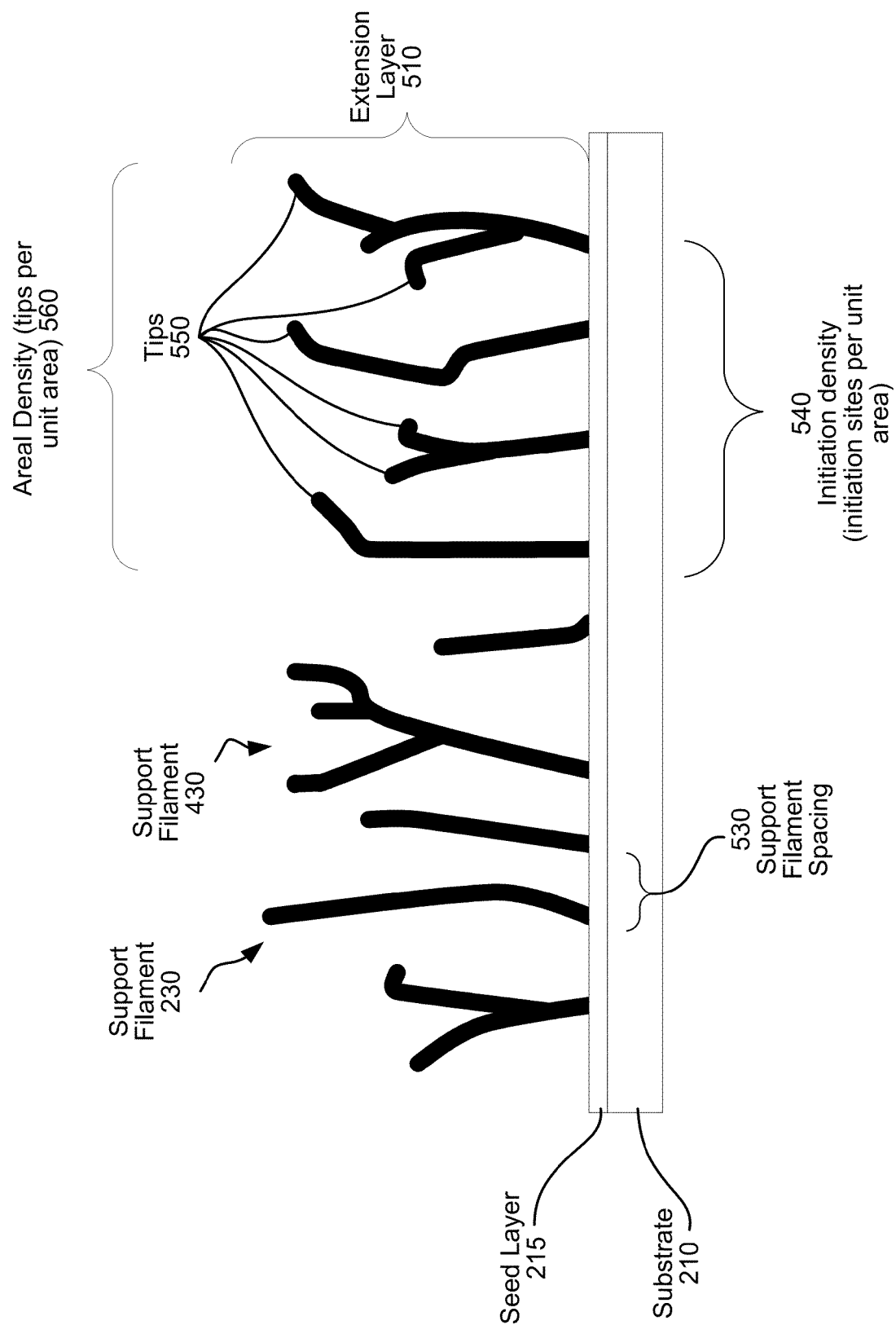
FIG. 5B illustrates details of support filaments and of the electrode of FIG. 5A, according to various embodiments of the invention.

FIG. 5B illustrates details of support filaments 230 and 430 of the electrode 500 of FIG. 5A. FIG. 5B differs from FIG. 5A in that the intercalation layers 240 and 440 of the electrode extension 520 are omitted for clarity. The electrode extensions 520 as illustrated in FIG. 5A and FIG. 5B optionally include an ordered or semi-ordered ensemble of the support filaments 230 and/or 430, as illustrated in FIGS. 3 and 4C respectively. The electrode extensions 520 provide an electrical path, through the support filaments 230 and/or 430, to the substrate 210. Alternatively, a higher resistance is used in various applications. The support filaments 230 and/or 430 also provide a mechanical base for deposition/growth of the DAM. The support filaments 230 and/or 430 further provide strength (e.g., tensile strength, compression strength, shear strength, and/or the like) to the electrode extensions 520 for supporting the intercalation layer 240 and 440 during expansion and/or contraction of the DAM during intercalation and preventing breakage of the intercalation layer and/or separation of the electrode extensions 520 from the substrate 210.

The DAM may coat some but not all of the support filament 230 and/or 430. In some embodiments, most of the support filament is coated by the DAM. However, the trunk 235 of the support filament 230 and/or 430 may remain uncoated, essentially uncoated, or minimally coated. This has the effect of allowing the DAM in the intercalation layers 240 and/or 440 to flex and move during expansion/contraction, while reducing the likelihood of separation of the support filaments 230 and/or 430 separating from the substrate 210 at the seed layer 215. In various embodiments, the intercalation layer covers between 90 and 99%, 75 and 90%, 25 and 75%, and less than 25% of support filaments 230 and/or 430.

The thickness of the DAM in the intercalation layers 240 and/or 440 may be determined by various features of the support filaments 230 and/or 430. These features include the spacing of the nearest neighbor support filament or support filament spacing 530 and the diameter 310 of the support filament 230 and/or 430.

The DAM can be grown/deposited on the support filaments 230 and/or 430 to form the intercalation layer 440 using a various methods. These methods include evaporation, sputtering, PECVD, low-pressure chemical vapor deposition (LPCVD), VLS, electroplating, and electro-less deposition.

Various methods may be used to achieve an appropriate height of the extension layer 510. Examples of these methods include relying on the aspect ratio of the grown support filaments 230 while performing a directional deposition; electro-deposition or electro-less deposition at the bottom layer to isolate the trunk; sputter and light etch of a masking layer to open the support filament 230 to DAM growth/deposition; pre-coupling layer isolation (i.e. mask seed locations) prior to growth of the support filaments 230 and/or 430; modifying growth parameters of the support filaments 230 and/or 430 to achieve an advantageous aspect ratio (such as a tree like structure), or performing a deposit and directional etch back to free the support filaments 230 and/or 430 from DAM coverage.

In some embodiments, the diameter 310 of the initial growth of the support filament 230 and/or 430 is determined by the thickness of the final layer of the seed layer 215. For example, in various embodiments, the thickness of the seed layer 215 is less than 150 angstroms, between 150 and 500 angstroms, and greater than 500 angstroms. The material used for the final layer of the seed layer 215 may also control the initial diameter 310 of the support filament. For example, a given thickness of nickel may produce a support filament diameter 310 during initial growth of support filaments 230 and/or 430 that is substantially different from the diameter produced by the same thickness of iron. Standard lithography techniques may be applied to print an initiation site 330 of predetermined diameter in the final layer 260 of the seed layer 215, which in turn controls the diameter 310 during initiation of growth of the support filament 230 and/or 430.

An initiation density 540 of extension layer 510 may be expressed in terms of initiation sites per unit area. The initiation density 540 depends on an average of the support filament spacing 530. An areal density 560 of extension layer 510 may be expressed in terms of tips 550 per unit area. The areal density 560 depends on the initiation density and average number of tips 550 per support filament 230 and/or 430. The initiation density 540 and the areal density 560, as well as the support filament spacing 530, may depend in part on the same parameters that control diameter 310. In various embodiments, the thickness of the final seed layer, material choice, differing reverse-micelle process techniques, a lithography pattern, and/or the like may all contribute to a determination of the initiation density 540 and/or the areal density 560. In some embodiments, the support filament spacing 530 is influenced by the diameter 310 of the support filaments 230 and/or 430.

The adhesion of the support filaments 230 and/or 430 to the substrate 210 is partially determined by the material choice of the seed layer, and the particular growth process employed. In some embodiments, carbide may be formed at the base of the CNT/CNF to provide adhesion, therefore implying tip growth. Base growth, in some instances, may also provide adhesion.

Figure 6A:
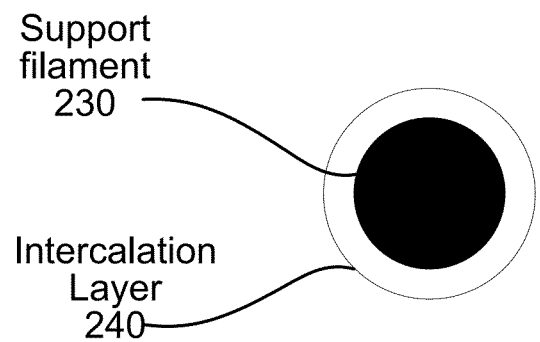
FIG. 6A illustrates a cross section of an electrode extension of FIG. 2A taken along line a-a, according to various embodiments of the invention.
Figure 6B:
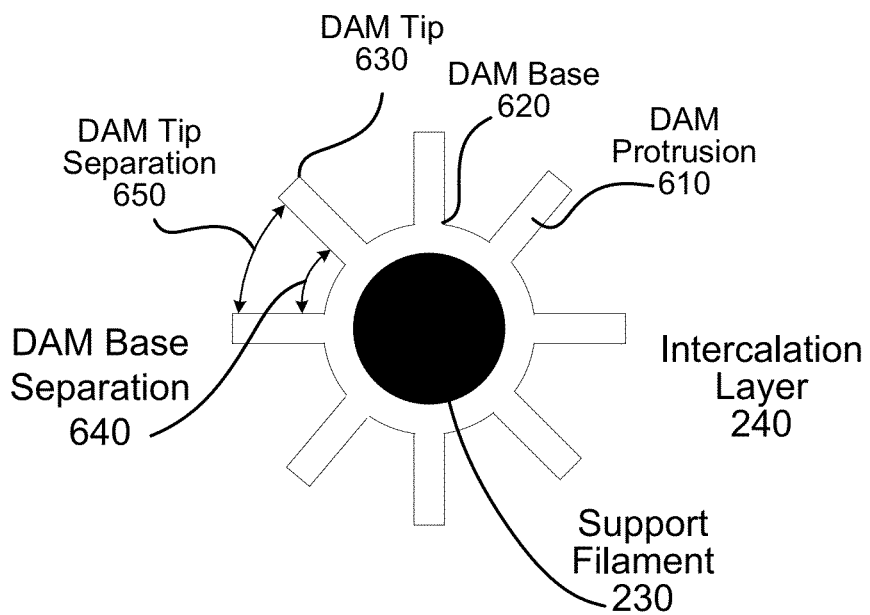
FIG. 6B illustrates a cross section of a support filament of FIG. 2A taken along line a-a, according to various embodiments of the invention.

FIG. 6A illustrates a cross section of an embodiment of electrode extension 220 of FIG. 2A taken along line a-a. The DAM is illustrated in FIG. 6A forming a layer around the support filament 230. FIG. 6B illustrates a cross section of an embodiment of the electrode extension 220 of FIG. 2A taken along line a-a. FIG. 6B differs from FIG. 6A in that the intercalation layer 240 of FIG. 6B includes DAM protrusions 610 produced using the various methods of forming nanostructures discussed elsewhere herein. The DAM process includes a base 620 and a tip 630. A base separation 640 is a distance between the DAM bases 620 of adjacent DAM processes 610. A tip separation 650 is a distance between the DAM tips 620 of adjacent DAM processes 610. A minimum distance for a DAM base separation 640 is about zero.

Figure 6C:
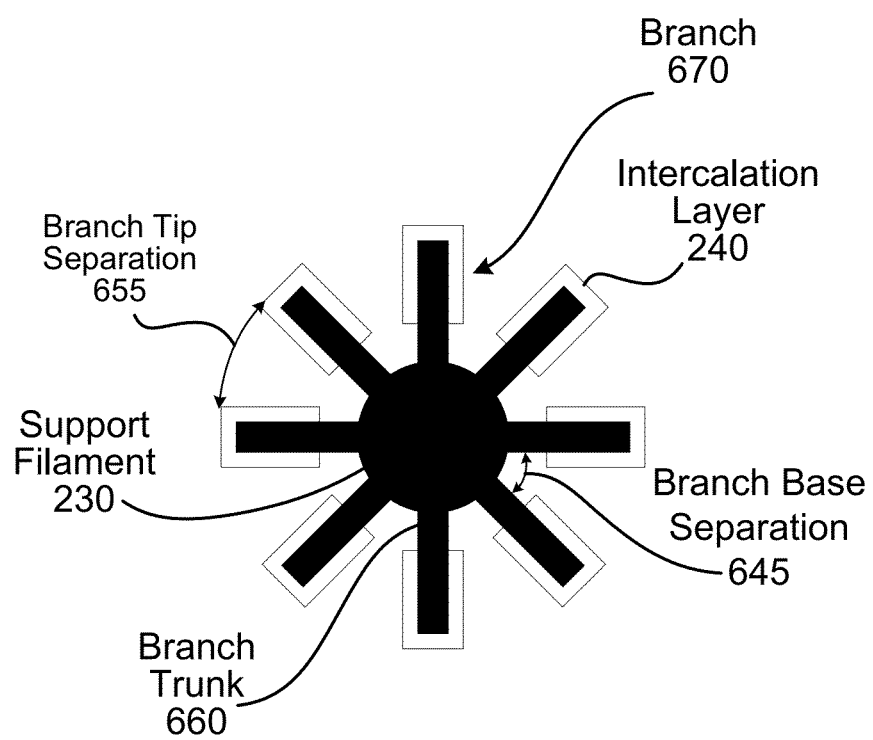
FIG. 6C illustrates a cross section of the support filament of FIG. 2A taken along line a-a, according to various embodiments of the invention.

FIG. 6C illustrates a cross section of an embodiment of the electrode extension 220 of FIG. 2A taken along line a-a. FIG. 6C differs from FIG. 6A in that the electrode extension 220 includes branches 670, similar to branches 430a-430c illustrated in FIG. 4B. The branches 670 include an intercalation layer 240. The intercalation layer 240 optionally does not cover the entire branch 670. Thus a branch trunk 660 is formed along the branch 670 between the intercalation layer 240 and the support filament 230. In some embodiments a branch tip separation distance 655 is determined by a thickness selected for the intercalation layer 240 and a branch base separation distance 645 is determined by an expansion of the intercalation layer 440 and a diameter of the branch 670.

Figure 7:
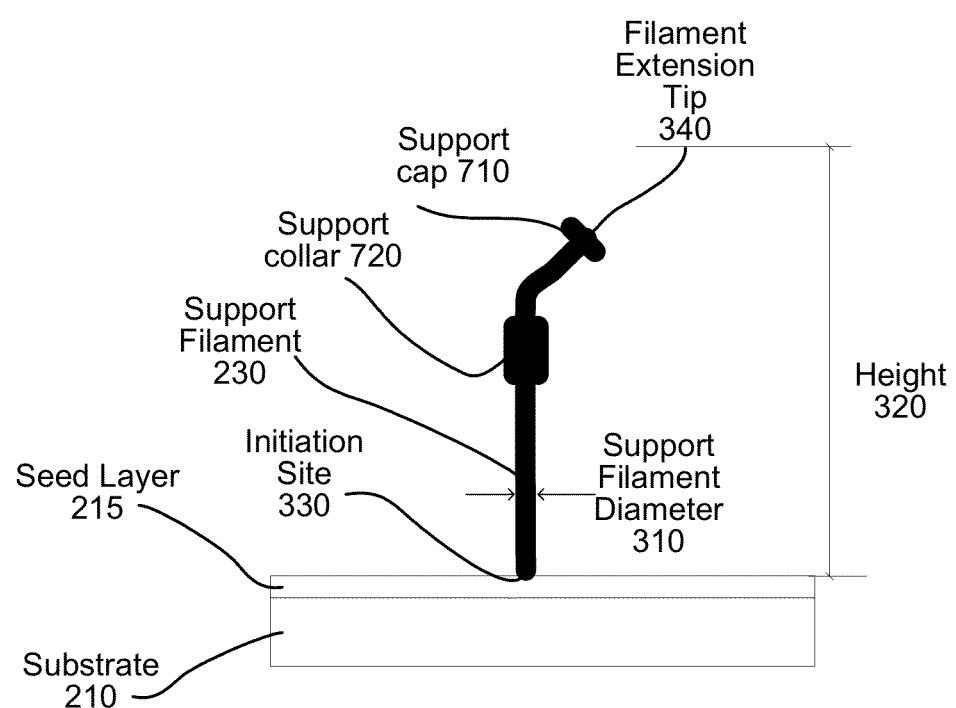
FIG. 7 illustrates further embodiments of a support filament, according to various embodiments of the invention.

FIG. 7 illustrates further embodiments of a support filament, according to various embodiments of the invention. These embodiments include a support cap 710 and a support collar 720. Support cap 710 and support collar provide additional surface area to which intercalation layer 240 may be attached. Support collar 720 may be disposed near the initiation cite (optionally in contact with seed layer 215), or anywhere along the length of support filament 230 or a branch thereof.

In some embodiments the width of support cap 710 and/or support collar 720 are selected to be at least as large as the width of the intercalation layer 240 when the intercalation layer is fully expanded. For example, if the intercalation layer has a diameter of 160 nanometers when fully expanded, then the support cap 710 and/or support collar 720 are at least 160 nanometers.

In various embodiments, the support cap 710 and/or support collar 720 may act as anchor points for the DAM as well as constraints for the expansion of the DAM along the length of the electrode extension 425. For example the support cap 710 may be configured to prevent the DAM from moving off of the end of the support filament 430 as the result of repeated expansions and contractions. Support cap 710 and/or support collar 720 are examples of variation in the diameter of support filament 430. Other variations are possible. For example, the diameter may be changed on a periodic basis, gradually, and/or abruptly. In some embodiments, support filament 430 has a greater diameter distal from the substrate 210 relative to adjacent to the substrate 210.

Figure 8:
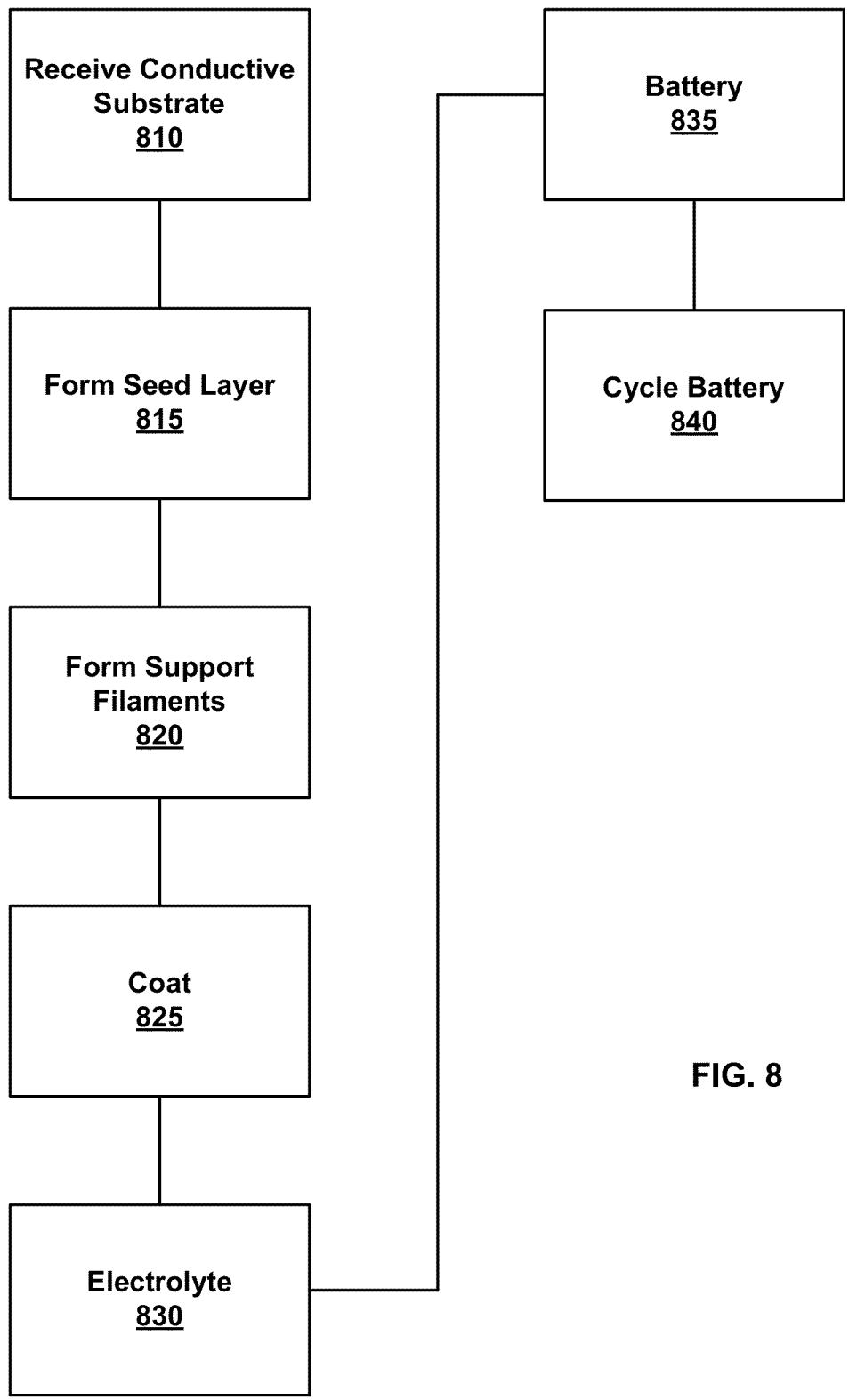
FIG. 8 illustrates methods of producing and optionally using an electrode, according to various embodiments of the invention.

FIG. 8 illustrates methods of producing and optionally using an electrode, according to various embodiments of the invention. In a receive conductive substrate step 810 substrate 210 is received. Substrate 210 may be prepared for addition of seed layer 215 or direct attachment of support filament 230. Substrate 210 may be provided by a third party or may be manufactured by the party performing the methods of FIG. 8.

In an optionally form seed layer step 815, seed layer 215 is formed on substrate 210. Form seed layer step 815 is optional in embodiments wherein support filament 230 is attached directly to substrate 210. In some embodiments, form seed layer step 815 includes depositing or growing more than one sub-layer of seed layer 215.

In a form support filaments step 820 a plurality of support filaments 230 are formed on seed layer 215 or substrate 210. In various embodiments the formed support filaments 230 have an aspect ratio (length/width) of at least 5:1, 10:1, 20:1, 50:1 or 100:1.

In a coat step 825 the support filaments 230 formed in form support filaments step 820 are coated with intercalation layer 240 to form an electrode. As discussed elsewhere herein, a trunk 235 of support filaments 230 is optionally left uncoated or with a coat of smaller thickness than other areas of support filaments 230. In various embodiments, the intercalation layer 240 coated on support filaments 230 has at least a two, five or ten times greater ion adsorbing or absorbing capacity for ions than the support filaments 230.

In an optional electrolyte step 830 the electrode formed in step 825 is placed in an electrolyte solution. The electrode may be a cathode or an anode. In some embodiments, placement of the coated support filaments 230 in contact with an electrolyte will cause ion uptake and swelling of the intercalation layer 240.

In an optional battery step 835, the electrode formed in step 825 is placed in one cell of a rechargeable battery. The electrode may be used as a cathode or anode. In some embodiments electrodes formed using step 825 are used in both the cathode and anode of the rechargeable battery.

In an optional cycle battery step 840, the battery of step 835 is repeatedly cycled (charged and discharged). In the process the intercalation layer 240 absorbs and desorbs ions repeatedly without detaching the plurality of support filaments 230 from the substrate 210. It has been found that a rechargeable batter using some embodiments of the improved electrodes described herein can be fully cycled over 600 times without significant loss of charge carrying capacity. This ability to cycle can be dependent on the presence or size of trunk 235. This ability to make repeated cycles may be achieved while at the same time achieving an improvement in charge capacity of over six times relative to systems that lack intercalation layer 440.

Several embodiments are specifically illustrated and/or described herein. However, it will be appreciated that modifications and variations are covered by the above teachings and within the scope of the appended claims without departing from the spirit and intended scope thereof. For example, an additional binder layer may be used to cover the electrode including electrode extensions 220. This binder layer may include an ion permeable membrane configured to pass ions to and from intercalation layer 240.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
   A first electrode disposed in a first region of electrolyte and including
   a substrate,
   a plurality of support filaments attached to the substrate, and
   a non-particulate ion absorbing material attached to the support filaments and configured to expand in volume at least 5 percent when absorbing ions;
   a separator configured to separate the first region and a second region of electrolyte; and
   a second electrode disposed in the second region of electrolyte, the first and second electrodes and separator configured to operate as a rechargeable battery.

2. The system of claim 1, wherein the ion absorbing material covers some but not all of each of the plurality of support filaments.

3. The system of claim 1, wherein the ion absorbing material covers an area of a member of the plurality of support filaments distal to the substrate and does not cover an area of the member of the plurality of support filaments proximate to the substrate.

4. The system of claim 1, wherein a thickness of the ion absorbing material is greater at an end of the support filaments distal to the substrate relative to a thickness at an end of the support filaments proximate to the substrate.

5. The system of claim 1, wherein the plurality of support filaments are each branched.

6. The system of claim 1, wherein the ion absorbing material includes silicon.

7. The system of claim 1, wherein the plurality of support filaments comprise a carbon nano-tube (CNT), a carbon nano-fiber (CNF), or a nano-wire (NW).

8. The system of claim 1, wherein a density of the plurality of support filaments is selected such that the ion absorbing material can expand at least 200 percent in volume without detaching members of the plurality of support filaments from the substrate.

9. The system of claim 1, wherein the plurality of support filaments are each less than 500 nanometers and greater than 100 nanometers in diameter.

10. The system of claim 1 further comprising an over-layer disposed over the ion absorbing layer.

11. The system of claim 10 wherein the over-layer comprises silicon dioxide.

12. An electrode comprising:
    a conductive substrate;
    a plurality of support filaments attached to the substrate, the support filaments comprising a carbon nano-tube (CNT), a carbon nano-fiber (CNF), or a nano-wire (NW), and
    a non-particulate ion absorbing material attached to some but not all of each of the support filaments and configured to expand in volume by at least five percent when absorbing ions.

13. The electrode of claim 12, wherein the ion absorbing material is disposed on the support filaments so as to form a trunk of the support filaments essentially not coated by the ion absorbing material.

14. The electrode of claim 13, wherein the trunk is at least 0.25 micrometers to several micrometers in length.

15. The electrode of claim 12, wherein the ion absorbing material includes silicon.

16. The electrode of claim 12, wherein the plurality of support filaments are attached to the conductive substrate using a seed layer.

17. The electrode of claim 16 wherein the seed layer comprises a plurality of different sub-layers.

18. The electrode of claim 17 wherein the plurality of different sub-layers includes a layer of a transition metal.

19. The electrode of claim 12 wherein the substrate comprises a porous material.

20. The electrode of claim 12 wherein the substrate comprises low oxygen content copper.

21. The electrode of claim 12 further comprising an over-layer disposed over the ion absorbing layer.

22. The electrode of claim 21 wherein the over-layer comprises silicon dioxide.

23. A method comprising:
receiving a conductive substrate;
forming a plurality of support filaments coupled to the conductive substrate, the support filaments having an aspect ratio (length/width) of at least 10:1 to approximately 100:1; and
coating the plurality of support filaments with a non-particulate ion absorbing material to create an electrode, the ion absorbing material having at least a two times greater ion absorbing capacity for ions than the support filaments.

24. The method of claim 23, further comprising forming a seed layer on the substrate, the seed layer configured for forming the plurality of support filaments.

25. The method of claim 23, further comprising placing the electrode in contact with an electrolyte.

26. The method of claim 23, further comprising using the electrode in a rechargeable battery.

27. The method of claim 23, further comprising repeatedly using the electrode to absorb and desorb ions without detaching the plurality of support filaments from the substrate.

28. The method of claim 23, wherein coating the plurality of support filaments with the ion absorbing material includes producing a trunk of the support filaments proximate to the substrate essentially free of ion absorbing material.

29. The method of claim 28, wherein producing the trunk comprises forming the ion absorbing material over the entire length of each support filament, masking the support filaments except where the trunk will be produced, and exposing the support filaments to an etch to remove the ion absorbing material where exposed by the mask.

30. The method of claim 23, wherein forming the plurality of support filaments includes vapor deposition of the support filaments.

31. The method of claim 23, wherein forming the plurality of support filaments includes electro-chemical deposition from solution of the support filaments.

32. A system comprising:
A first electrode disposed in a first region of electrolyte and including
a substrate,
a plurality of support filaments attached to the substrate, and
an ion absorbing material attached to the support filaments;
a separator configured to separate the first region and a second region of electrolyte; and
a second electrode disposed in the second region of electrolyte, the first and second electrodes and separator configured to operate as a rechargeable battery.

33. The system of claim 32, wherein the ion absorbing material covers some but not all of each of the plurality of support filaments.

34. The system of claim 32, wherein the ion absorbing material covers an area of a member of the plurality of support filaments distal to the substrate and does not cover an area of the member of the plurality of support filaments proximate to the substrate.

35. The system of claim 32, wherein a thickness of the ion absorbing material is greater at an end of the support filaments distal to the substrate relative to a thickness at an end of the support filaments proximate to the substrate.

36. The system of claim 32, wherein the plurality of support filaments are each branched.

37. The system of claim 32, wherein the ion absorbing material includes silicon.

38. The system of claim 32, wherein the plurality of support filaments comprise a carbon nano-tube (CNT), a carbon nano-fiber (CNF), or a nano-wire (NW).

39. The system of claim 32, wherein a density of the plurality of support filaments is selected such that the ion absorbing material can expand at least 5 percent up to approximately 400 percent in volume without detaching members of the plurality of support filaments from the substrate.

40. The system of claim 32, wherein the plurality of support filaments are each less than 500 nanometers and greater than 100 nanometers in diameter.

41. The system of claim 1, wherein the non-particulate ion absorbing material attached is configured to expand in volume by at least five percent up to 400% when absorbing ions.

42. The system of claim 32, wherein the plurality of support filaments are each greater than 500 nanometers in diameter.

* * * * *